United States Patent [19]

Linko, III et al.

[11] 4,155,680

[45] May 22, 1979

[54] COMPRESSOR PROTECTION MEANS

[75] Inventors: Peter J. Linko, III; Michael A. Radomski; William E. Schoenborn, all of Cincinnati, Ohio

[73] Assignee: General Electric Company, Cincinnati, Ohio

[21] Appl. No.: 768,589

[22] Filed: Feb. 14, 1977

[51] Int. Cl.² ............................................. F01B 25/00
[52] U.S. Cl. ..................................... 415/144; 415/168; 60/39.09 R; 60/39.09 P; 60/200 A; 428/680
[58] Field of Search ................... 415/121 G, 144, 145, 415/168, 199.5, 115; 60/39.07, 39.09 R, 39.09 P, 200 A; 428/660, 678, 680

[56] References Cited

U.S. PATENT DOCUMENTS

| 2,720,356 | 10/1965 | Erwin | 415/144 X |
| 2,837,270 | 6/1958 | Chapman | 415/145 UX |
| 3,983,092 | 9/1976 | Pratt et al. | 260/2.5 S |

FOREIGN PATENT DOCUMENTS

| 586928 | 11/1959 | Canada | 428/678 |
| 589136 | 12/1959 | Canada | 415/145 |
| 1012339 | 4/1952 | France | 415/144 |

Primary Examiner—Carlton R. Croyle
Assistant Examiner—Donald S. Holland
Attorney, Agent, or Firm—Henry J. Policinski; Derek P. Lawrence

[57] ABSTRACT

In a gas turbine engine including a compressor having a casing with a passage adapted to pass bleed air to a circumferentially extending bleed manifold surrounding the casing, the passage including a surface exposed to incendiary particles periodically entrained in the bleed air, an improvement is provided comprising means for preventing impingement of the particles upon the exposed surface. In one form the means is disposed between the exposed surface and the bleed air and is comprised of a material which, when reacted with the particles, produces a compound which is essentially nonpyrophoric in the environment of the passage.

19 Claims, 4 Drawing Figures

U.S. Patent    May 22, 1979    Sheet 2 of 2    4,155,680
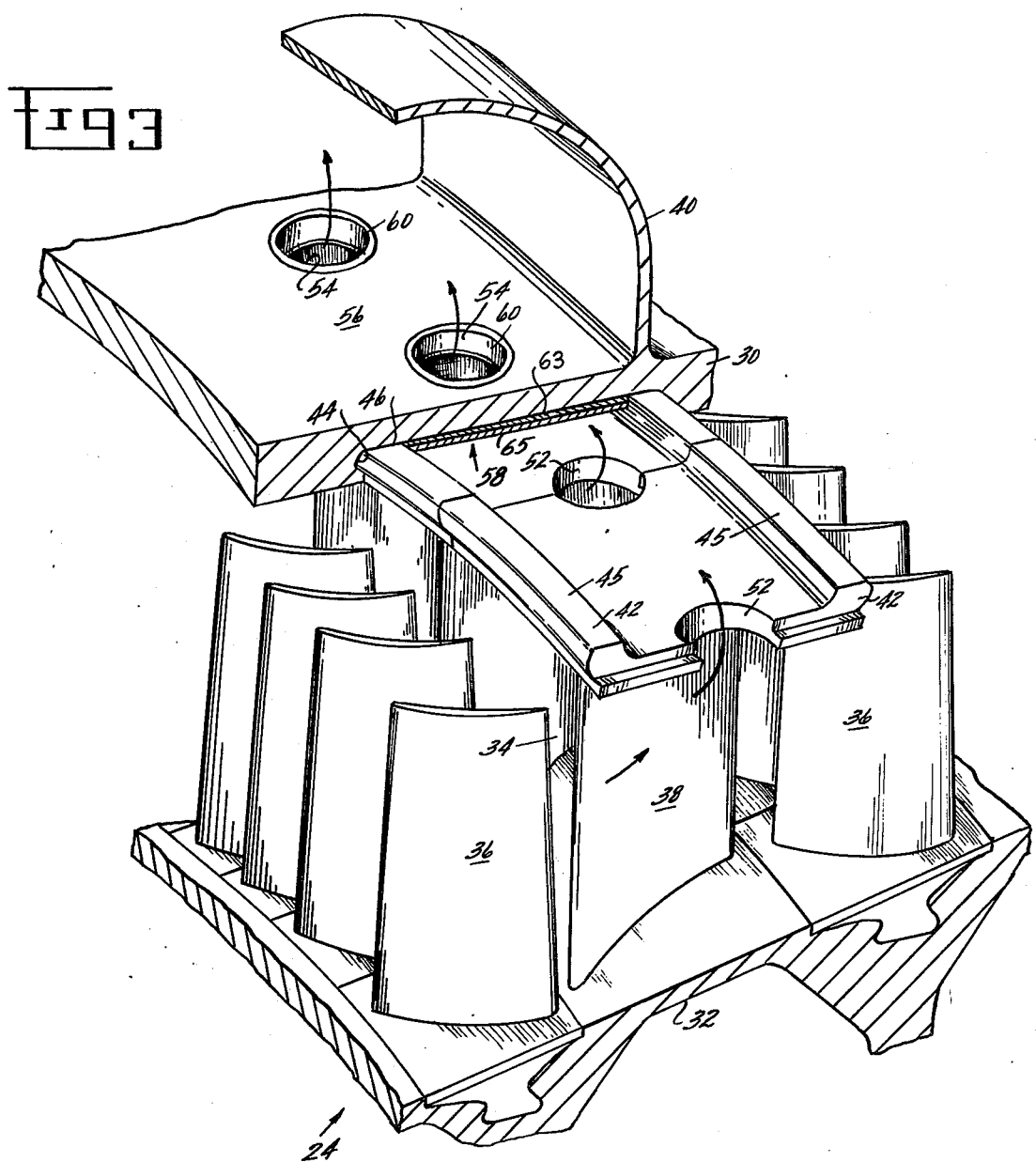
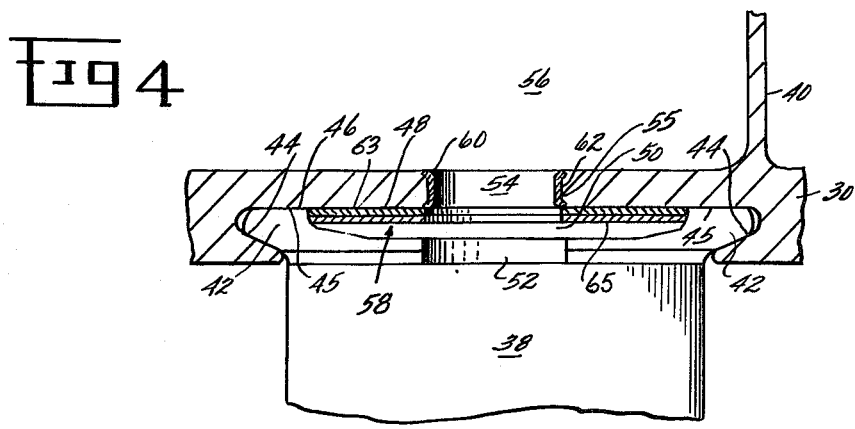

COMPRESSOR PROTECTION MEANS

The invention herein described was made in the course of or under a contract, or a subcontract thereunder, with the United States Department of the Air Force.

BACKGROUND OF THE INVENTION

This invention relates to an apparatus for protecting the compressor casing and bleed manifold associated with a gas turbine engine from the deleterious effects of particles entrained in the gas stream of the gas turbine engine.

Gas turbine engines of modern vintage utilize lightweight materials, such as titanium as structural members in the construction of various components of the fan and compressor section of the engine. For instance, compressor rotors, rotor and stator airfoils, compressor casings and frames have all been constructed of titanium materials. These components have generally exhibited excellent performance and life characteristics during prolonged operation in the severe environment encountered in a gas turbine engine.

On extremely rare occasions, during the course of engine operation, abnormal conditions, such as fan blade, turbine blade or bearing failure, may cause high unbalance of the rotating components of the engine or in the case of failure of a titanium component a piece of Ti debris may lodge between the compressor rotating blade tip and the stator portion. In such an instance, rotating compressor blades may rub against their respective stationary casings or lodged Ti debris whereupon friction-generated heat and high internal engine pressure may cause titanium particles to ignite and burn. Molten, burning titanium particles may enter the high velocity gas flow stream for passage downstream.

Associated with compressor section of gas turbine engine, bleed manifolds are disposed adjacent bleed holes in the compressor for the purpose of drawing off pressurized air required by various mechanical systems on board the aircraft. The manifolds are generally constructed of relatively thin and unprotected walls which are particularly susceptible to the deleterious effects of the molten burning titanium particles. It has also been found that exposed titanium surfaces of the titanium compressor adjacent the bleed holes react with the entrained titanium particles and contribute to the deterioration of the manifold. More particularly, high velocity pressurized air, in which the titanium particles are entrained, impinges upon the exposed titanium surfaces of the compressor casing adjacent the bleed holes to cause the titanium casing to spontaneously ignite, melt and form additional incendiary titanium particles. These particles pass through the bleed holes and impinge upon and deteriorate the aforementioned thin-walled manifold.

Portions of the compressor casing other than the surfaces adjacent the bleed holes do not appear to be affected significantly by the molten titanium particles. This resistance is attributed to the fact that the internal surfaces of the compressor casing in the main gas stream flowpath are coated with various materials for the purpose of providing a relatively soft rub interface between the titanium casing and the rotating components of the compressor to avoid damage thereto and to provide a satisfactory gas seal necessary to avoid flow losses associated at the tips of the rotating blades. It has not previously been recognized that such coatings protect the titanium compressor casing from ignition by molten titanium particles nor has it even been recognized that the titanium casing requires such protection from ignition. This invention addresses the aforementioned problems by providing means for protecting the compressor casing and associated manifold in a number of complementary or alternative embodiments.

SUMMARY OF THE INVENTION

It is therefore an object of the present invention to provide means for protecting the compressor casing and manifold from the deleterious effects of molten titanium particles entrained in the gas stream of a gas turbine engine.

It is another object of the present invention to provide coating means for protecting the compressor casing and manifold from the deleterious effects of molten titanium particles entrained in the gas stream of a gas turbine engine.

Briefly stated, these and other objects which will become apparent from a reading of the following specification and appended drawings are accomplished by the present invention which provides in one form an improvement for use in a gas turbine engine including a compressor having a casing with a mounting slot adapted to receive a mounting tang of a stationary airfoil, a plurality of bleed apertures extending through the casing and communicating the slot with a bleed manifold, each of the apertures having an aperture surface area and the slot having a first surface in engagement with the tang and a second surface spaced from the tang. The improvement comprises first means for preventing incendiary particles entrained in a gas stream flowing through the slot from impinging upon the second surface. Shielding means may also be provided for isolating the aperture surface area from impingement by said particles. The first means may be comprised of coating means and the shielding means may be comprised of grommet means.

DESCRIPTION OF THE DRAWINGS

While the specification concludes with a series of claims which particularly point out and distinctly claim the subject matter comprising the present invention, a clear understanding of the invention will be obtained from the following detailed description, which is given in connection with the accompanying drawings in which:

FIG. 3 depicts a perspective view, partially in cross section, of that portion of the compressor or section shown in FIG. 2.

FIG. 4 depicts an enlarged cross-sectional view of the portion of the compressor section shown in FIG. 2 showing a typical stator blade mounted in a groove of the compressor casing.

DESCRIPTION OF THE PREFERRED EMBODIMENT

Figure 1:
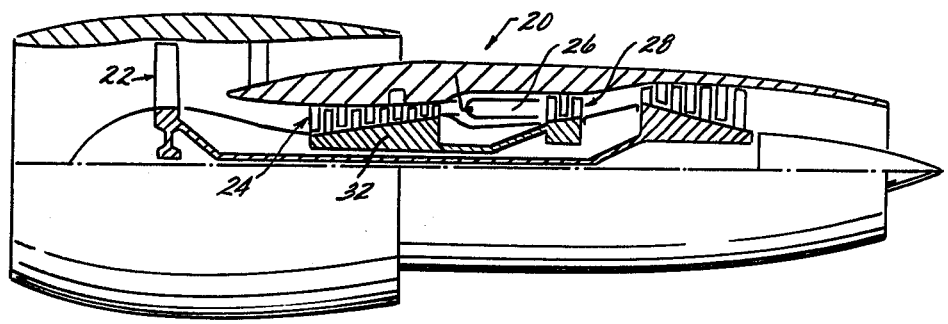
FIG. 1 depicts a schematic view of a typical gas turbine engine.

Referring to FIG. 1, a schematic view is depicted of a gas turbine engine, shown generally at 20, to which the present invention is applicable. Engine 20 is comprised generally of fan section 22, compressor section 24, combustor section 26 and turbine section 28 arranged in a serial flow relationship. The operation of the gas turbine engine shown in FIG. 1 is well known to those skilled in the art and hence a description of engine operation is not deemed to be necessary.

Figure 2:
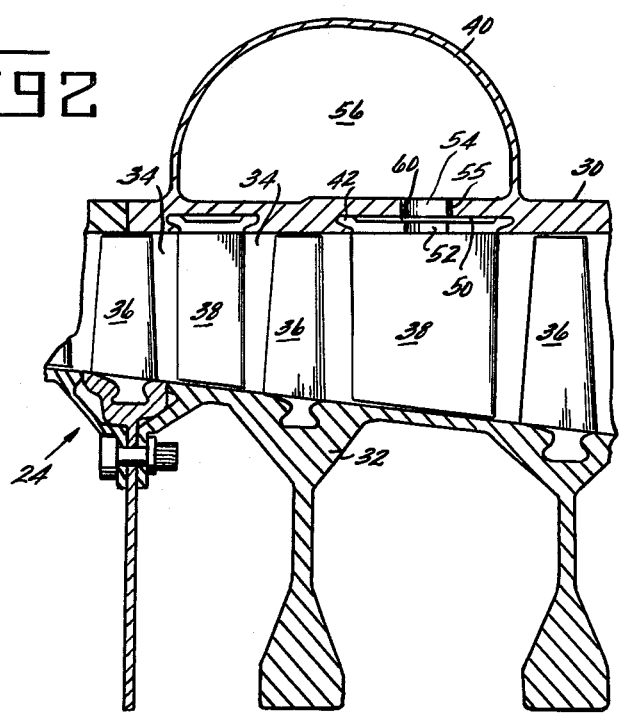
FIG. 2 depicts a cross-sectional view of a portion of a compressor section of the gas turbine engine shown in FIG. 1.

Referring now to FIG. 2, an enlarged view of a portion of the compressor section 24 depicted in FIG. 1 is shown. Compressor section 24 is comprised of axially extending generally cylindrical compressor casing 30 and an axially extending generally cylindrical rotor spool 32 disposed radially inwardly of and spaced from casing 30 to form an annular gas flow passage 34. Depending radially outwardly from rotor spool 32 a plurality of staged rotor blades or airfoils 36 are disposed within and extend across gas flow passage 34.

Spool 32 and rotor airfoils 36 are rotatably driven by drive shaft means (not shown) for the purpose of compressing gas flowing within gas passage 34. A plurality of staged stator vanes or airfoils 38 fixedly secured to compressor casing 30 and project radially inwardly into gas passage 34, each stage of airfoils 38 being interposed between successive stages of rotor airfoils 36. Stator airfoils 38 serve to properly direct the flow of gas into the next downstream stage of rotor airfoils 36. Bleed manifold 40 extends circumferentially about the exterior of compressor casing 30 for the purpose of drawing off compressed air from the gas flow passage 34 in a manner hereinafter to be described for the purpose of meeting requirements of various mechanical systems on board the aircraft.

With reference to FIGS. 3 and 4, each of stator airfoils 38 includes a mounting platform or tang 42 which is received in a circumferentially extending groove or slot 44 machined in casing 30. Circumferentially adjacent stator airfoils 38 abut one another to form the aforementioned circumferentially extending stage. Mounting slot 44 may be of any of a number of configurations, as may be the tangs 42 of stator airfoils 38; the only requirement being that tangs 42 be of a configuration sufficient to affect mating engagement thereof with mounting slot 44.

For purposes of this description, slot 44 is comprised of a first surface 46 adapted to abuttingly engage complementary surface 45 on mounting tang 42 and an exposed second surface 48 spaced apart from tang 42 so as to form a circumferentially extending cavity 50 between tang 42 and surface 48. Cavity 50 provides a circumferentially extending passage between mounting platform 42 and casing to facilitate the passage of compressed gas from flow passage 34 to manifold 40 in a manner hereinafter to be described.

A plurality of apertures 52 are provided in mounting platforms 42 for the purpose of admitting pressurized gas from annular flow passage 34 to cavity 50. Pressurized gas exits cavity 50 through a plurality of apertures 54, each having an exposed aperture surface 55, disposed circumferentially spaced apart in casing 30 and communicating cavity 50 with manifold chamber 56 within manifold 40. Hence, pressurized gas may be bled from annular flow passage 34 via a flow path comprised of apertures 52 in mounting platforms 42, cavity 50 and apertures 54 in casing 30.

As hereinbefore explained, under certain abnormal conditions, molten titanium particles may become entrained in the gas flowing in annular passage 34. These particles may be drawn into cavity 50 as the pressurized gas is drawn off through apertures 52 and may impinge upon exposed second surface 48 of slot 44 and upon exposed aperture surface 55 of apertures 54. Since casing 30 is also fabricated with titanium, the titanium particles tend to ignite the titanium casing 30 in an area at and adjacent bleed apertures 54. Ignition of the titanium casing 30 produces additional titanium particles which also become entrained in the gas stream flowing through apertures 54 into manifold chamber 56. Subsequent impingement of these additional particles upon manifold 40 contributes to damage of manifold 40.

The present invention overcomes these shortcomings by providing means for preventing impingement of the titanium particles upon surface 48 of slot 44 and aperture surface area 55 of apertures 54. More specifically, means are provided for covering or isolating surfaces 48 and surface areas 55 from exposure to the gas stream and hence from the molten titanium particles entrained therein. Isolation of surfaces 48 and 55 precludes ignition and melting of titanium casing 30 and hence additional titanium particles are not formed.

In order to isolate surface 48 of slot 44 an ignition resistant coating 58 is bonded to surface 48 by conventional techniques such as plasma spraying. Coating 58 is applied to those areas of surface 48 which would otherwise be exposed to the titanium particles entrained in the gas stream. Isolation of surface areas 55 is achieved by applying the same coating to surface areas 55 of apertures 54. However, since the diameter of apertures 54 is relatively small, the spraying of surface areas 55 is difficult, and therefore it has been found to be advantageous to provide shielding means or grommets 60 within apertures 54 to accomplish isolation of surface areas 55 from the titanium particles in the gas stream.

Grommet 60 is of a generally cylindrical configuration having an exterior cylindrical surface 62 which abuttingly engages aperture surface areas 55 and an interior passage which provides an exit for the gas stream from cavity 50. Hence, with coating 58 applied to surface 48 and grommet 60 inserted in apertures 54 the exposed titanium surfaces of casing 30 are isolated from the molten titanium particles entrained in the gas stream.

It has been found that the objects of this invention may be advantgeously accomplished by utilizing a coating 58 comprised adjacent layers of metallic materials. A substrate layer 63 serves as a base coat to effect an excellent metallurgical bond between the coating 58 and the titanium casing 30 while a surface layer 65, covering the substrate, serves as an inhibitor to further combustion of the titanium particles. More particularly, the surface layer is selected such that it reacts with the titanium particles to form compounds of titanium that are non-pyrophoric or essentially non-pyrophoric in the environment of the gas turbine engine. Base coats, 10 to 40 mils in thickness, comprised of compounds of 95% nickel and 5% aluminum or of 75% nickel, 20% chromium and 5% aluminum are particularly well suited to form the required metallurgical bond with the titanium casing 30. Additionally, the application of a surface layer, 2 to 30 mils in thickness, comprised of aluminum serves to inhibit further combustion since the aluminum will react with the titanium particles to form $Ti_3Al$ and/or $TiAl$ which are essentially non-pyrophoric. Hence, not only does a coating 58 comprised of the aforedescribed materials serve as a physical barrier between the compressor casing 30 and the titanium particles but the coating also serves to diminish the incendiary action of the particles. It should be noted that while the aforedescribed materials have been used by those skilled in the art to provide a relatively soft rub interface between the compressor casing 30 and the rotating portions of the compressor, they have not been introduced into a gas turbine for use as ignition inhibitors nor applied to the exposed titanium surfaces 48 and 55 of compressor casing 30.

The material of which grommet 60 is fabricated must also be carefully selected. Some materials, of course, are completely incompatible with the high temperature environment associated with the gas turbine engine. Others such as certain metals while compatible with the engine environment are not compatible with the titanium particles in the gas stream. By way of example, iron when ignited by the impinging molten titanium particles tends to form a molten iron oxide which in turn contributes to more intense burning of the titanium via what is commonly termed a thermite reaction, $FeO + Ti \rightarrow TiO + Fe + heat$. The concentration of oxygen atoms (number of atoms per unit volume) in solid or liquid metal oxides is over three orders of magnitude greater than oxygen in air at ambient conditions. Hence the propensity for intense chemical reaction is extremely high when hot liquid oxides of certain metals contact the titanium particles and combustion is enhanced.

It has been found that nickel or molybdenum rich alloys minimize the possibility of the occurrence of a thermite reaction. Nickel-rich alloys do not readily oxidize and hence a high concentration of oxygen atoms is not presented to enhance combustion when a titanium particle strikes the nickel-rich grommet. Furthermore, nickel-rich alloys do not burn but rather tend to melt or sublime during which time the alloy absorbs heat. The absorbed heat is then not available to promote further combustion of the titanium particles. Molybdenum-rich oxides oxidize in the form of a gas rather than a liquid. Consequently, the oxygen atoms available to react with titanium are not concentrated and further combustion of the impinging titanium particles is not promoted as with liquid metal oxides. Not only do grommets fabricated of alloys rich in materials which lessen the propensity for a thermite reaction to occur, such as nickel and molybdenum, inhibit combustion of titanium but they also serve as a physical barrier between the titanium particles and the titanium casing 30.

From the foregoing it is now apparent that the embodiments of the invention herein described are well adapted to fulfill the aforestated objects of the present invention and that while these embodiments have been described for purposes of illustration, it is understood that other equivalent forms of the invention are possible within the scope of the appended claims. Having thus described the invention,

What is claimed as new and useful and desired to be secured by U.S. Letters Patent is:

1. In a gas turbine engine including a compressor having a casing with a mounting slot adapted to receive a mounting tang of a stationary airfoil, a plurality of bleed apertures extending through said casing and communicating said slot with a bleed manifold extending about said casing radially outwardly thereof, each of said apertures having an aperture surface area, said slot having a first surface in engagement with said tang and a second surface spaced from said tang, the improvement comprising:
   first means for preventing incendiary particles entrained in a gas stream flowing through said slot from impinging upon said second surface, wherein said first means is comprised of coating means bonded to said second surface to isolate said second surface from impingement by said particles.

2. The invention as set forth in claim 1 further comprising shielding means for isolating said aperture surface area from impingement by said particles.

3. The invention as set forth in claim 1 wherein said coating means is comprised of a material which when reacted with said particles produces a compound which is essentially non-pyrophoric in said slot.

4. The invention as set forth in claim 1 wherein said coating means is comprised of a first layer of material comprised substantially of nickel.

5. The invention as set forth in claim 4 wherein said coating means is further comprised of a second layer of material applied to and over said first layer and having the characteristic of reacting with said particles to form a compound which is essentially non-pyrophoric in the environment of said slot.

6. The invention as set forth in claim 4 wherein said coating means is further comprised of a second layer of aluminum applied to and over said first layer.

7. In a gas turbine engine including a compressor having a casing with a mounting slot adapted to receive a mounting tang of a stationary airfoil, a plurality of bleed apertures extending through said casing and communicating said slot with a bleed manifold extending about said casing radially outwardly thereof, each of said apertures having an aperture surface area, said slot having a first surface in engagement with said tang and a second surface spaced from said tang, the improvement comprising:
   first means for preventing incendiary particles entrained in a gas stream flowing through said slot from impinging upon said second surface; and
   shielding means for isolating said aperture surface area from impingement by said particles.

8. The invention as set forth in claim 7 wherein said shielding means is comprised of grommet means disposed within said aperture for isolating said aperture surface from impingement by said particles.

9. The invention as set forth in claim 7 wherein shielding means is comprised of coating means covering said aperture surface area for isolating said aperture surface area from impingement by said particles.

10. The invention as set forth in claim 9 wherein said coating means is comprised of a first layer of material comprised substantially of nickel and a second layer of material comprised substantially of aluminum.

11. In a gas turbine engine including a compressor having a casing, a plurality of bleed apertures each of said apertures having an aperture surface area extendng through said casing and communicating with a bleed manifold extending about said casing radially outwardly thereof, the improvement comprising:
   shielding means for preventing particles entrained in a gas stream flowing through at least one of said apertures from impinging upon said aperture surface area,
   wherein said shielding means is comprised of coating means having a first layer of material substantially comprised of nickel covering said aperture surface area for isolation of said aperture surface area from impingement by said particles.

12. The invention as set forth in claim 11 wherein said coating means is further comprised of a second layer of aluminum applied to said first layer.

13. In a gas turbine engine including a compressor having a casing, a plurality of bleed apertures, each of said apertures having an aperture surface area extending through said casing and communicating with a bleed manifold extending about said casing radially outwardly thereof, the improvement comprising grommet means disposed within said apertures for preventing particles entrained in a gas stream flowing through at least one of said apertures from impinging upon said aperture surface area, and wherein said grommet means is comprised of a material which is essentially nonpyrophoric and adapted to sublime in said aperture.

14. The invention as set forth in claim 13 wherein said grommet means is comprised of a nickel-rich material.

15. In a gas turbine engine including a compressor having a casing, a plurality of bleed apertures, each of said apertures having an aperture surface area extending through said casing and communicating with a bleed manifold extending about said casing radially outwardly thereof, the improvement comprising grommet means disposed within said apertures for preventing particles entrained in a gas stream flowing through at least one of said apertures from impinging upon said aperture surface area, and wherein said grommet means is comprised of a material which, when oxidized in said aperture, produces an oxide in gaseous form.

16. The invention as set forth in claim 15 wherein said grommet means is comprised of a molybdenum-rich material.

17. In a gas turbine engine includng a compressor having a casing with a passage adapted to pass bleed air to a circumferentially extending bleed manifold surrounding said casing, said passage including a surface exposed to incendiary particles periodically entrained in said bleed air, the improvement comprising means disposed between said surface and said bleed air for preventing impingement of said particles upon said exposed surface, said means comprised of a material which when reacted with said particles forms a compound which is essentially nonpyrophoric in the environment of said passage.

18. In a gas turbine engine including a compressor having a casing with a passage adapted to pass bleed air to a circumferentially extending bleed manifold surrounding said casing, said passage including a surface exposed to incendiary particles periodically entrained in said bleed air, the improvement comprising means disposed between said surface and said bleed air for preventing impingement of said particles upon said exposed surface, comprised of a material which is essentially nonpyrophoric and adapted to sublime in the environment of said passage.

19. In a gas turbine engine including a compressor having a casing with a passage adapted to pass bleed air to a circumferentially extending bleed manifold surrounding said casing, said passage including a surface exposed to incendiary particles entrained in said bleed air, the improvement comprising means disposed between said surface and said bleed air for preventing impingement of said particles upon said exposed surface, said means comprised of a material which, when oxidized in said passage, produces an oxide in gaseous form.

* * * * *